(12) United States Patent
Crook et al.

(10) Patent No.: US 10,091,955 B2
(45) Date of Patent: Oct. 9, 2018

(54) IRRIGATION SPIKE WATERING SYSTEM AND METHOD

(71) Applicant: Steel Table Group LLC, North Kansas City, MO (US)

(72) Inventors: Dale J. Crook, Olathe, KS (US); Richard G. Brull, North Kansas City, MO (US); Robert M. Coulston, Kansas City, MO (US); Brian A. Hager, Lenexa, KS (US); Curtis R. McMillan, Kansas City, MO (US); Stanton W. Fernald, Gardner, KS (US)

(73) Assignee: Steel Table Group LLC, North Kansas City, MO (US)

( * ) Notice: Subject to any disclaimer, the term of this patent is extended or adjusted under 35 U.S.C. 154(b) by 796 days.

(21) Appl. No.: 14/588,125

(22) Filed: Dec. 31, 2014

(65) Prior Publication Data
US 2015/0181820 A1    Jul. 2, 2015

Related U.S. Application Data

(60) Provisional application No. 62/018,370, filed on Jun. 27, 2014, provisional application No. 61/922,439, filed on Dec. 31, 2013.

(51) Int. Cl.
*A01G 29/00*    (2006.01)

(52) U.S. Cl.
CPC .................. *A01G 29/00* (2013.01)

(58) Field of Classification Search
CPC ...... A01G 29/00; A01G 25/02; A01G 25/023; A01G 25/06; A01C 23/02; B05B 15/062; F16L 41/065
(Continued)

(56) References Cited

U.S. PATENT DOCUMENTS

| | | | |
|---|---|---|---|
| 2,875,713 A | 3/1959 | Shoffner | |
| 3,473,770 A | 10/1969 | Edgerton | |

(Continued)

FOREIGN PATENT DOCUMENTS

EP    2458254    5/2012

OTHER PUBLICATIONS

"Antelco A8495 Drip Mate Professional Drip Irrigation Kit for Drip Irrigation Systems", http://www.sprinklerwarehouse.com/Antelco-Drip-Irrigation-Kits-p/a834, 2012, 1-2.

(Continued)

*Primary Examiner* — Trinh T Nguyen
(74) *Attorney, Agent, or Firm* — Law Office of Mark Brown, LLC; Christopher M. DeBacker

(57) ABSTRACT

An irrigation system for watering lawns, plants, flowers, shrubs, trees, or other plants. The irrigation system includes a plurality of irrigation spikes which clamp onto and puncture into a standard garden hose. The spikes are placed into soil where desired and the garden hose is placed into a clamp opening of the spikes, where a needle pierces the hose. In a preferred embodiment, the hose is deformed by the clamp opening into an oblong shape to improve water flow through the spike. An alternative embodiment includes a remote hose connecting the clamp to the stake portion of the spike, so that the stake can be placed a distance away from the hose for remote irrigation.

8 Claims, 20 Drawing Sheets

(58) Field of Classification Search
USPC .................................. 239/87, 273, 276, 280
See application file for complete search history.

(56) References Cited

U.S. PATENT DOCUMENTS

| | | | |
|---|---|---|---|
| 3,659,536 | A | 5/1972 | White |
| 4,017,958 | A | 4/1977 | Diggs |
| D263,903 | S | 4/1982 | Johnston |
| D284,785 | S | 7/1986 | Lemkin et al. |
| 4,870,781 | A | 10/1989 | Jones |
| 4,944,476 | A | 7/1990 | Olson |
| D316,367 | S | 4/1991 | Olson |
| 5,158,231 | A | 10/1992 | Christen et al. |
| 5,172,515 | A | 12/1992 | Lapshansky et al. |
| D339,508 | S | 9/1993 | Zeman |
| D340,626 | S | 10/1993 | Zeman |
| D341,755 | S | 11/1993 | Zeman |
| 5,435,490 | A | 7/1995 | Machut |
| D378,439 | S | 3/1997 | Gary et al. |
| 5,618,000 | A | 4/1997 | Lantzy et al. |
| 5,881,495 | A | 5/1999 | Clark |
| 6,243,986 | B1 | 6/2001 | Crowly |
| 6,343,616 | B1 | 2/2002 | Houtchens |
| 6,430,767 | B1 | 8/2002 | Ramos et al. |
| D481,444 | S | 10/2003 | Guo |
| 6,773,036 | B1 | 8/2004 | King |
| D497,973 | S | 11/2004 | Schapper |
| D577,966 | S | 10/2008 | Cosimo |
| D602,119 | S | 10/2009 | Terribile |
| D651,486 | S | 1/2012 | Li et al. |
| 8,413,372 | B2 | 4/2013 | King |
| 2004/0089738 | A1* | 5/2004 | Heren .............. A01G 25/02 239/271 |
| 2008/0005960 | A1* | 1/2008 | King .............. A01G 29/00 47/48.5 |
| 2009/0236490 | A1* | 9/2009 | Belford .............. A01G 25/023 248/545 |
| 2012/0223156 | A1 | 9/2012 | Nourian |
| 2012/0260568 | A1* | 10/2012 | King .............. A01G 29/00 47/48.5 |
| 2017/0175939 | A1* | 6/2017 | Nourian .............. F16L 41/065 |

OTHER PUBLICATIONS

"Buy Drip Irrigation Spikes: Delivery by Crocus.co.uk", http://www.crocus.co.uk/product/_/drip-irrigation-spikes/classid.200001, 2014, 1.

"Drip and Low-Flow Irrigation—Drippers—Lee Valley Tools", http://www.leevalley.com/en/garden/page.aspx?p=49665&cat=2,2280,49657, 2014, 1-3.

"Drip Irrigation Spike, Stakes, Hold-Downs & Clips Irrigation Direct", http://www.irrigationdirect.com/irrigation-products-and-supplies/drip-irri, 2014, 1-2.

"International Search Report and Written Opinion", PCT/US2015/068322, dated Mar. 17, 2016, pp. 1-11.

* cited by examiner

IRRIGATION SPIKE WATERING SYSTEM AND METHOD

CROSS-REFERENCE TO RELATED APPLICATIONS

This application claims priority in U.S. Provisional Patent Application No. 62/018,370, filed Jun. 27, 2014, and No. 61/922,439, filed Dec. 31, 2013, all of which are incorporated herein by reference.

BACKGROUND OF THE INVENTION

1. Field of the Invention

The present invention relates generally to a garden watering system and method of use, and more specifically to an irrigation spike watering system which can be used with standard garden hoses to provide subterranean irrigation to plants, trees, and lawns.

2. Description of the Related Art

Current products spread water on top of the ground to water plants and trees. This wastes water due to evaporation and drainage. Delivering water directly to a plant's roots through a subterranean system is preferred; however, existing measures for subterranean watering are more difficult to deploy, and are therefore rarely used.

Existing subterranean watering systems are cumbersome and expensive. They generally employ burying an irrigation hose underground, which requires an extensive amount of work and requires the lawn or soil above the buried hose to be patched after installation.

Other ground watering spikes are packaged together with the irrigation hose, which creates a cumbersome product to place, and impossible to repair when the hose is damaged without replacing the entire product.

Heretofore there has not been available a system or method for providing subterranean irrigation to plants with the advantages and features of the present invention.

BRIEF SUMMARY OF THE INVENTION

The present invention generally provides a watering system used to deliver water directly to the roots of plants and trees. The system consists of several small hollow spikes that carry water from a common garden hose to the plant and tree roots. The spikes can be placed along the length of any garden hose. A self-piercing needle taps into the garden hose. The spike deforms the garden hose to the optimum shape for delivering water through the self-piercing needle.

BRIEF DESCRIPTION OF THE DRAWINGS

The drawings constitute a part of this specification and include exemplary embodiments of the present invention illustrating various objects and features thereof.

DETAILED DESCRIPTION OF THE PREFERRED EMBODIMENTS

I. Introduction and Environment

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

II. Preferred Embodiment Irrigation Spike Watering System 2

Figure 1:
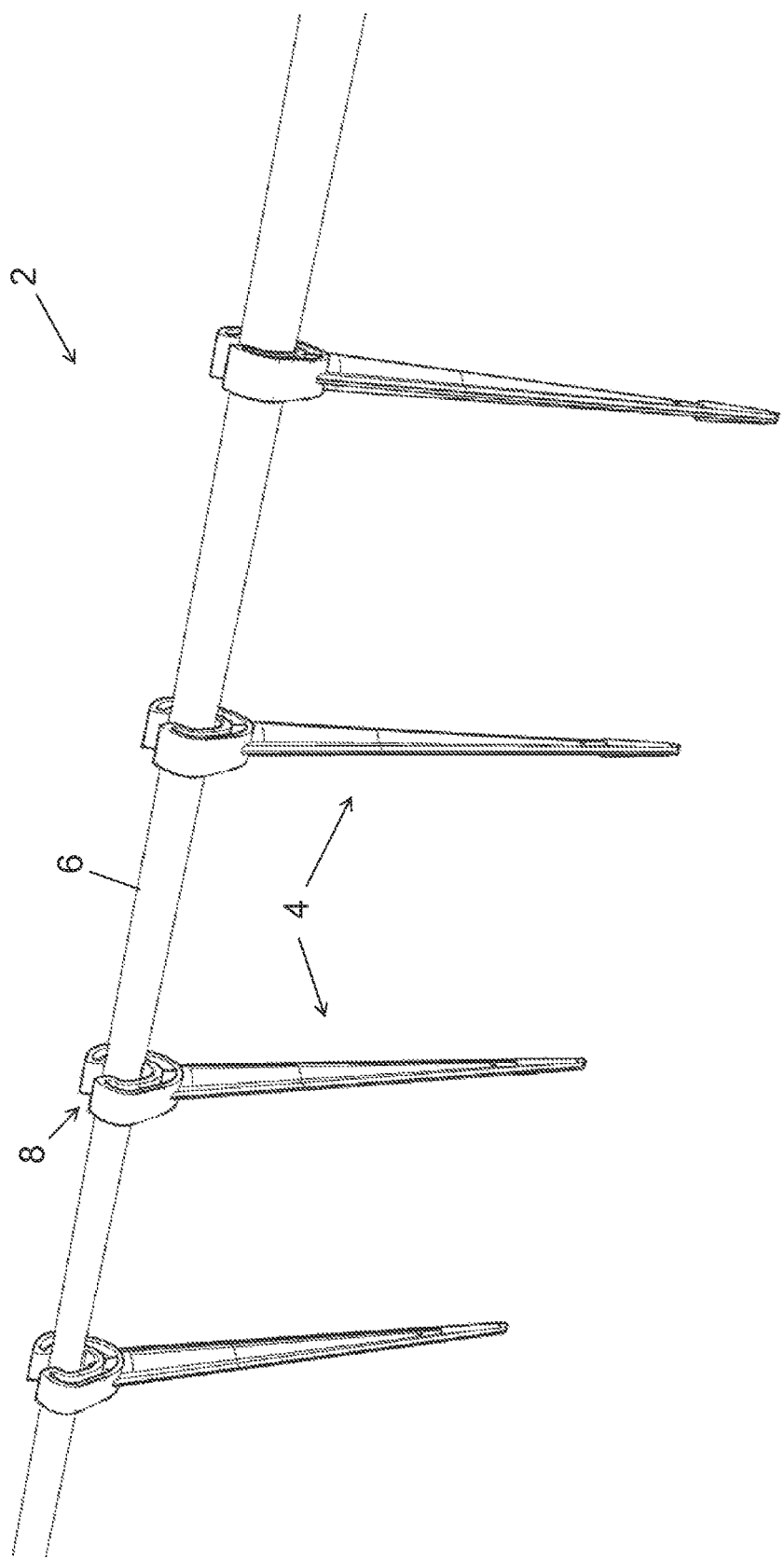
FIG. 1 is an isometric view of a preferred embodiment of the present invention.
Figure 2:
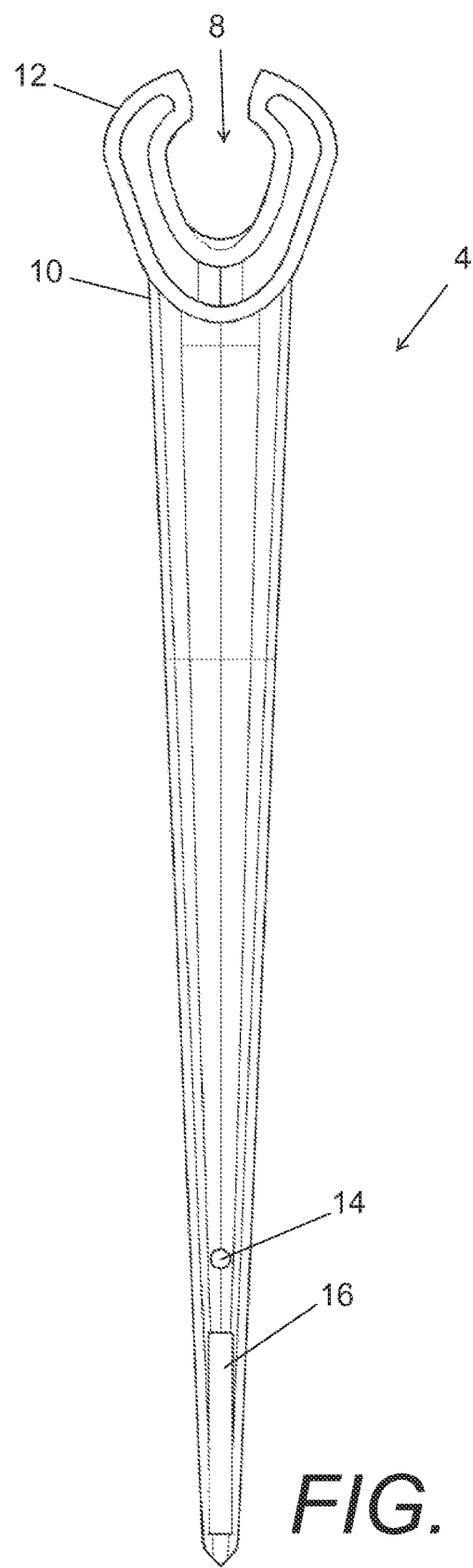
FIG. 2 is a front elevational view thereof.
Figure 3:
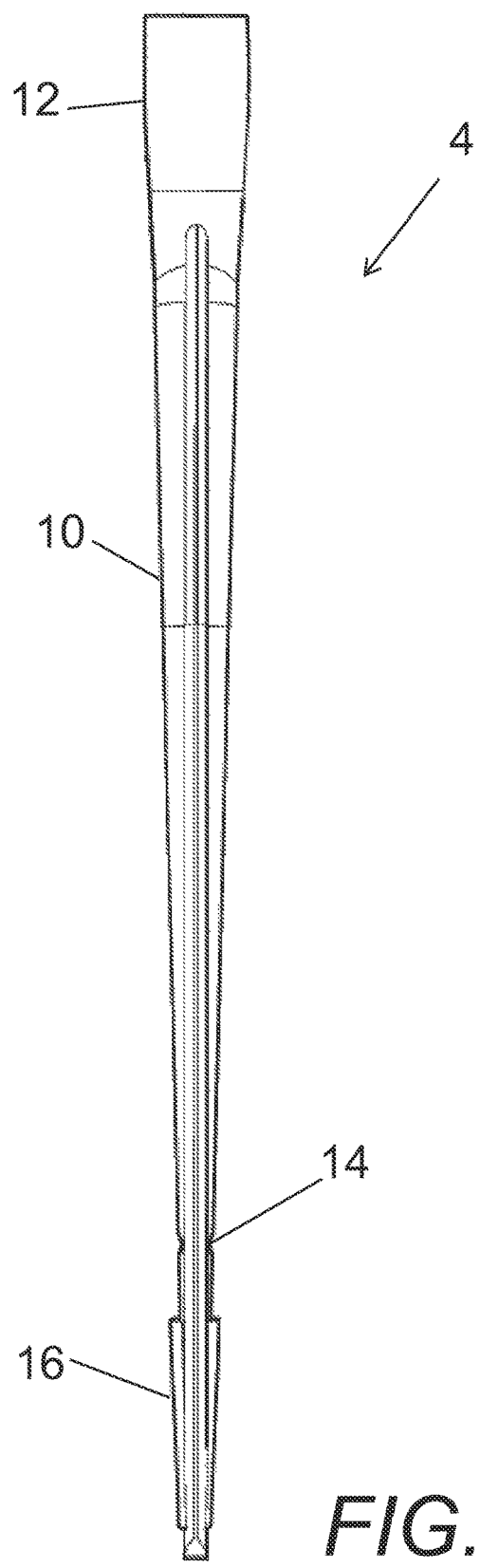
FIG. 3 is a side elevational view thereof.

Referring to the figures in more detail, FIG. 1 shows a preferred irrigation spike irrigation system 2 including a plurality of irrigation spikes 4 connected to a hose 6 via the attachment clamp 12. FIGS. 2 and 3 show the irrigation spike 4 in more detail, including the body of the spike 10 forming a tapered stake, the opening 8 of the attachment clamp 12 which is shaped to deform the hose when the hose is received by the clamp. Also shown in FIG. 2 is the irrigation outlet port 14 and the spike tip 16 which helps to separate the earth when inserting the spike, and then helps to prevent the spike from being inadvertently removed from the earth due to its shape.

Figure 4:
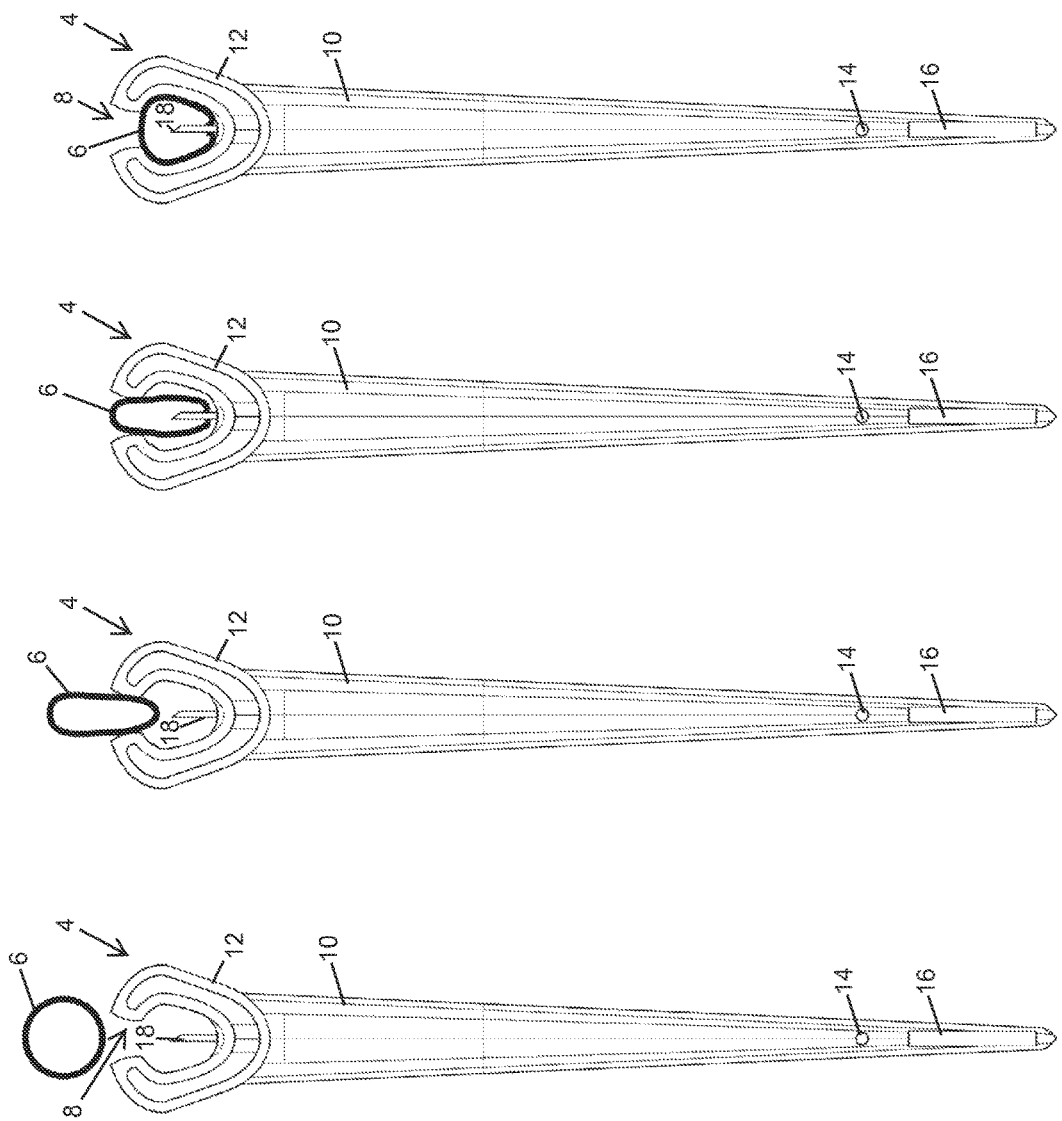
FIG. 4 is a front elevational view thereof, showing a progression of steps of installing a hose pipe into the embodiment.

FIG. 4 shows the progression of steps when inserting a hose 6 into the attachment clamp 12 of the spike 4. The hose deforms as it is inserted, and is pierced by a piercing needle 18. The shape of the needle along with the deformation of the hose provides an optimal flow of water down the needle 18 and out of the irrigation outlet port 14. Much testing has been performed to determine the shape of the clamp opening 8 such that the hose deforms into the shape shown in the last step of FIG. 4. The shape may be described as slightly "egg-like" or oblong, wherein the top curve of the hose within the opening 8 is larger than the bottom curve of the hose within the opening.

As water is piped through the hose 6, it enters the needles 18 which have pierced the hose, and passes through the body 10 of the spike 4, and passes out through the irrigation outlet port 14 underground, directly next to plant roots.

III. Alternative Embodiment Remote Irrigation Spike Watering System 102

Figure 5:
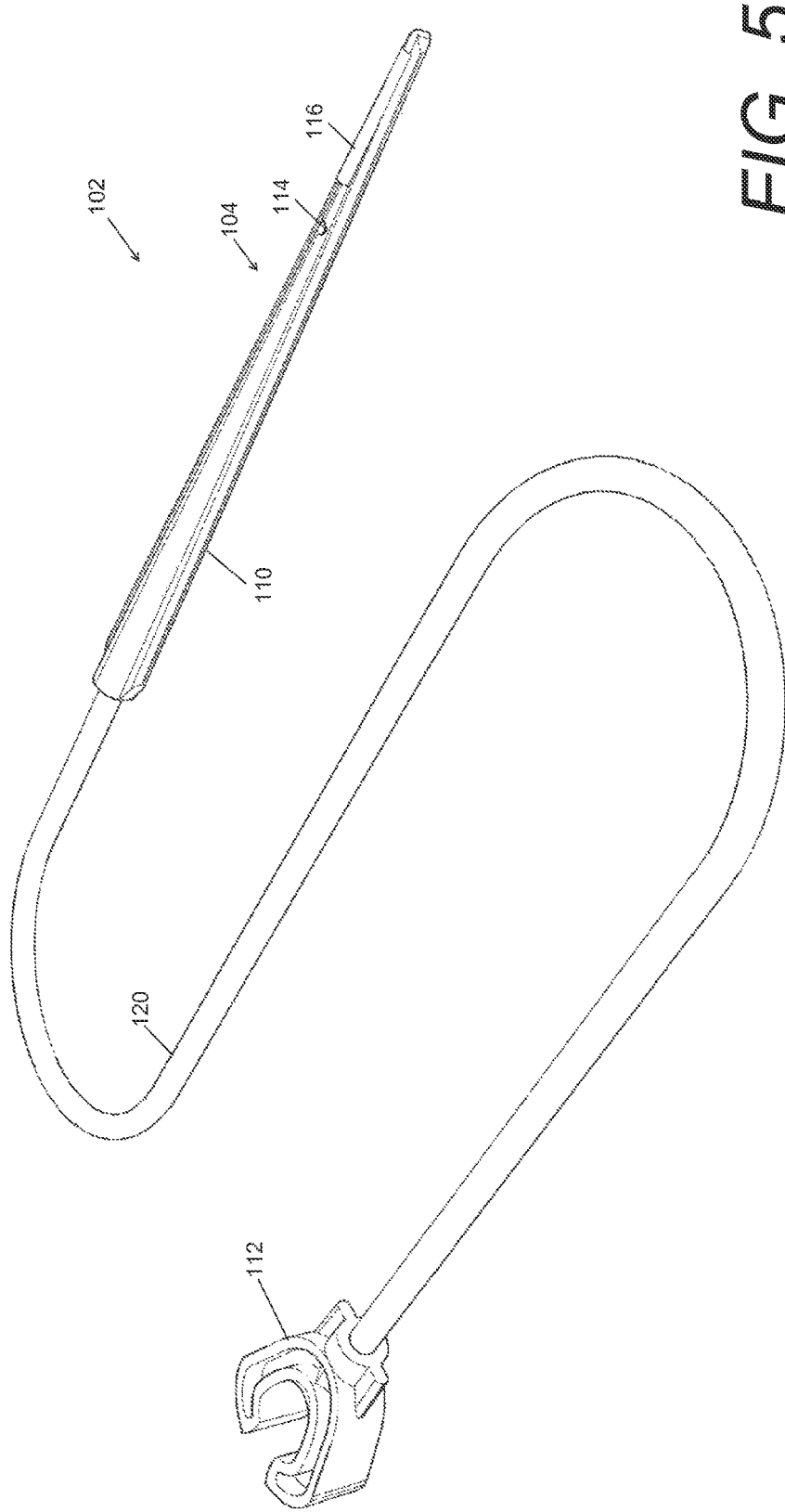
FIG. 5 is an isometric alternative embodiment of the present invention.
Figure 6:
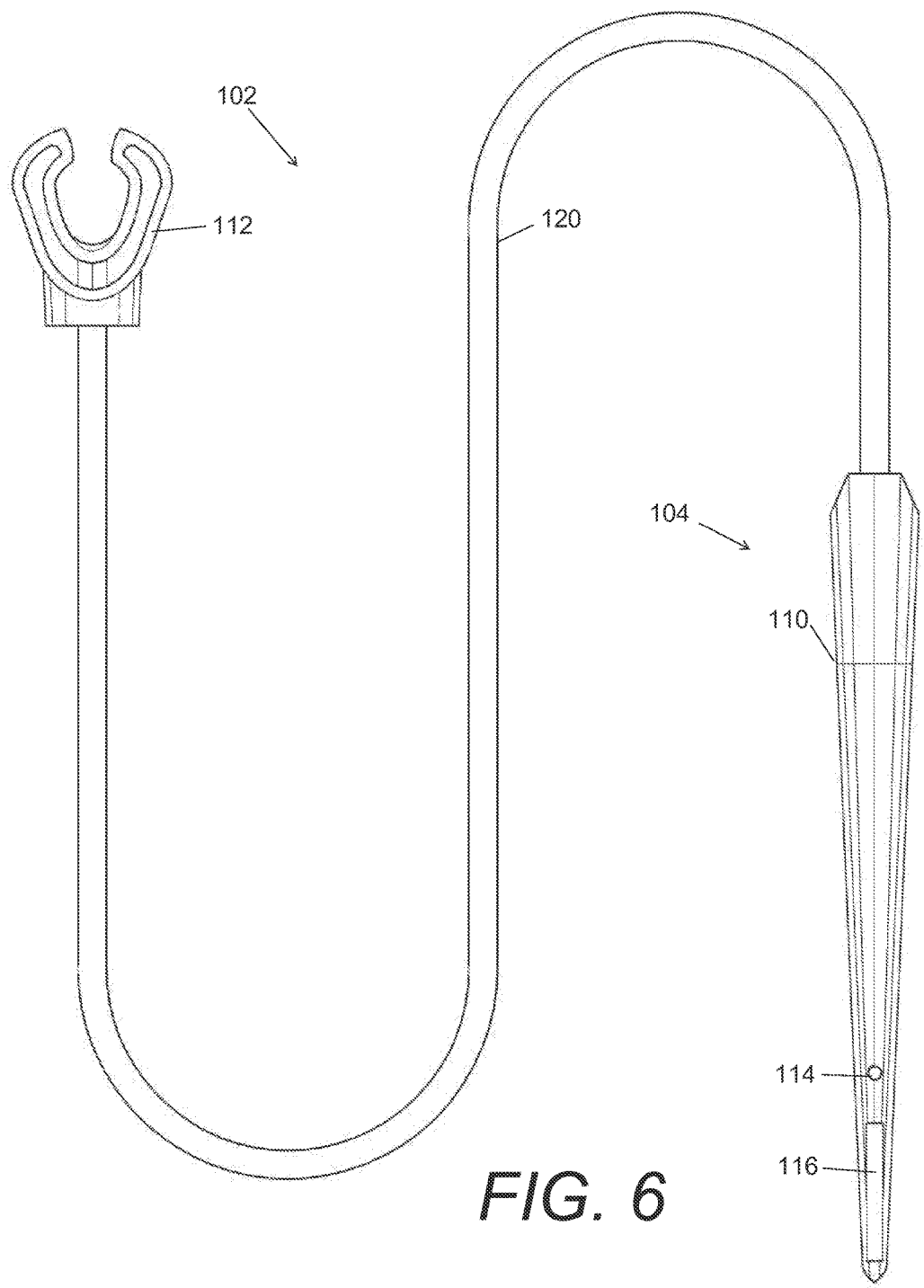
FIG. 6 is a front elevational view thereof.
Figure 7:
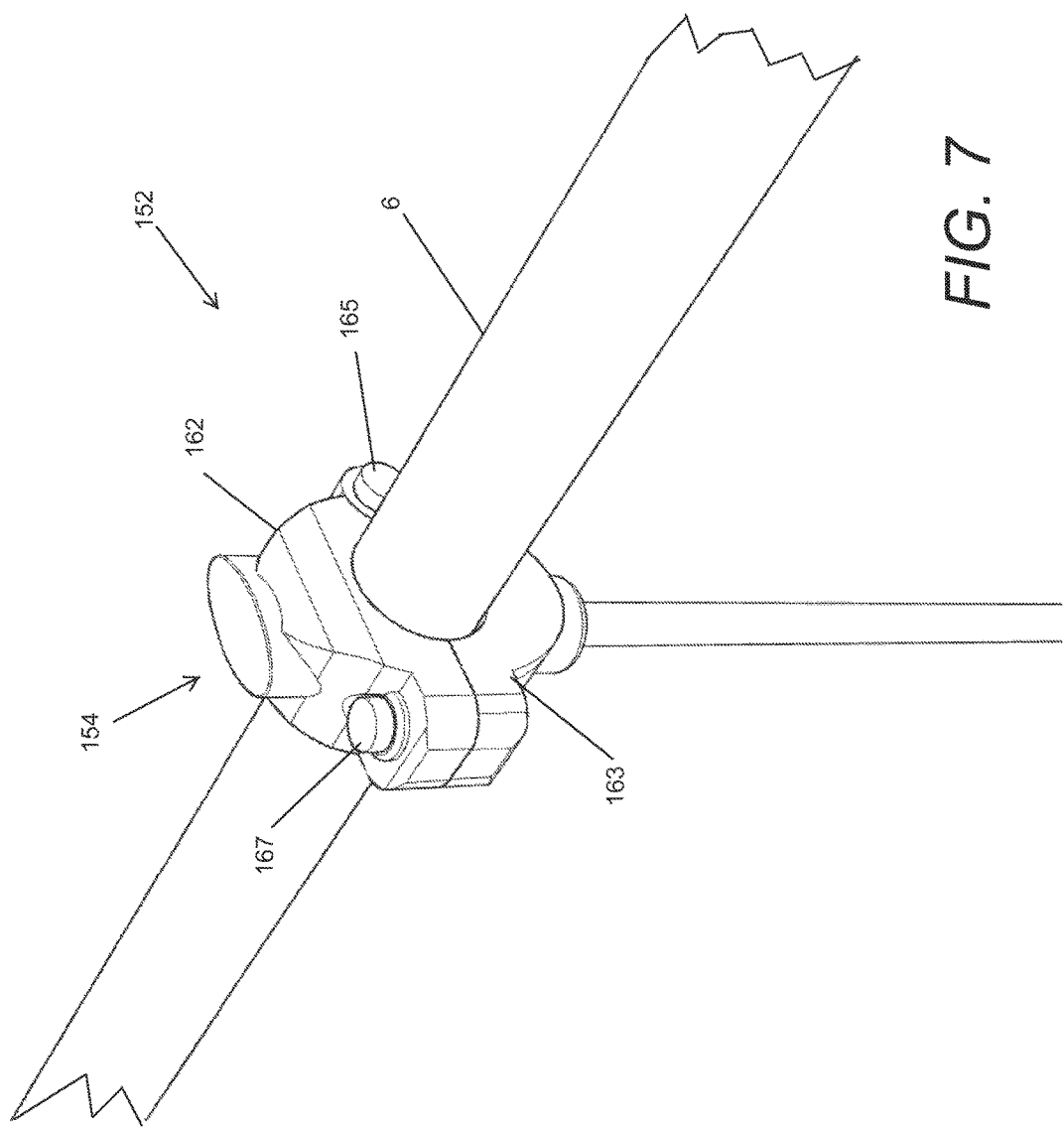
FIG. 7 is an isometric view of yet another alternative embodiment of the present invention.
Figure 8:
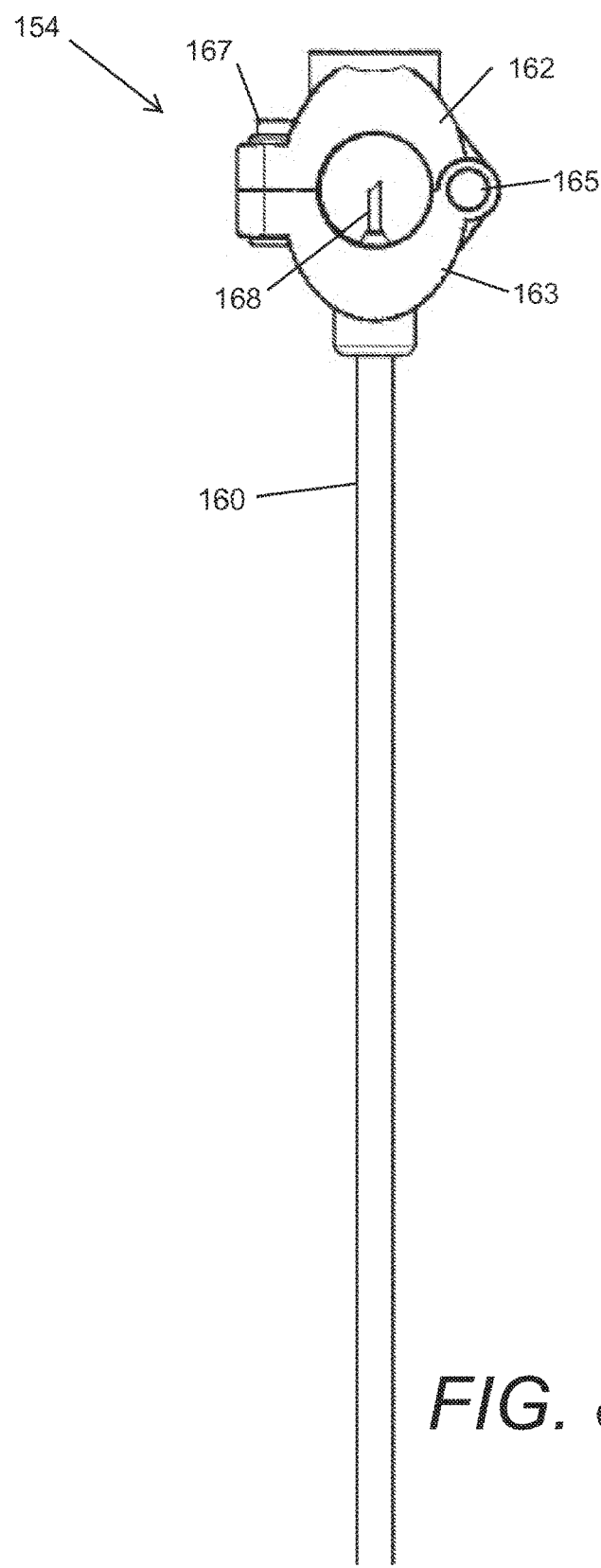
FIG. 8 is a front elevational view thereof, showing the embodiment in a closed position.
Figure 9:
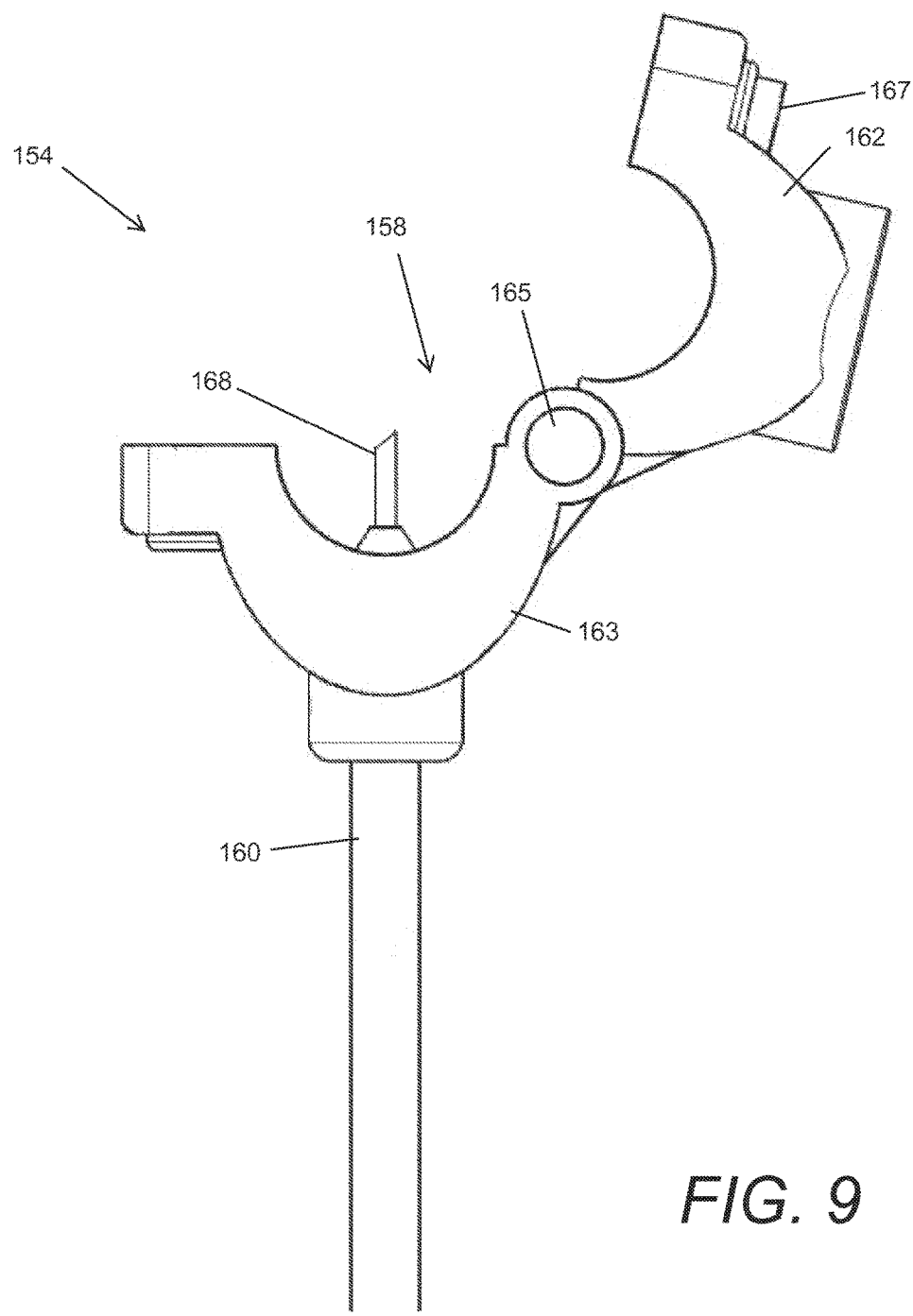
FIG. 9 is a front elevational view thereof, showing the embodiment in an open position.
Figure 10:
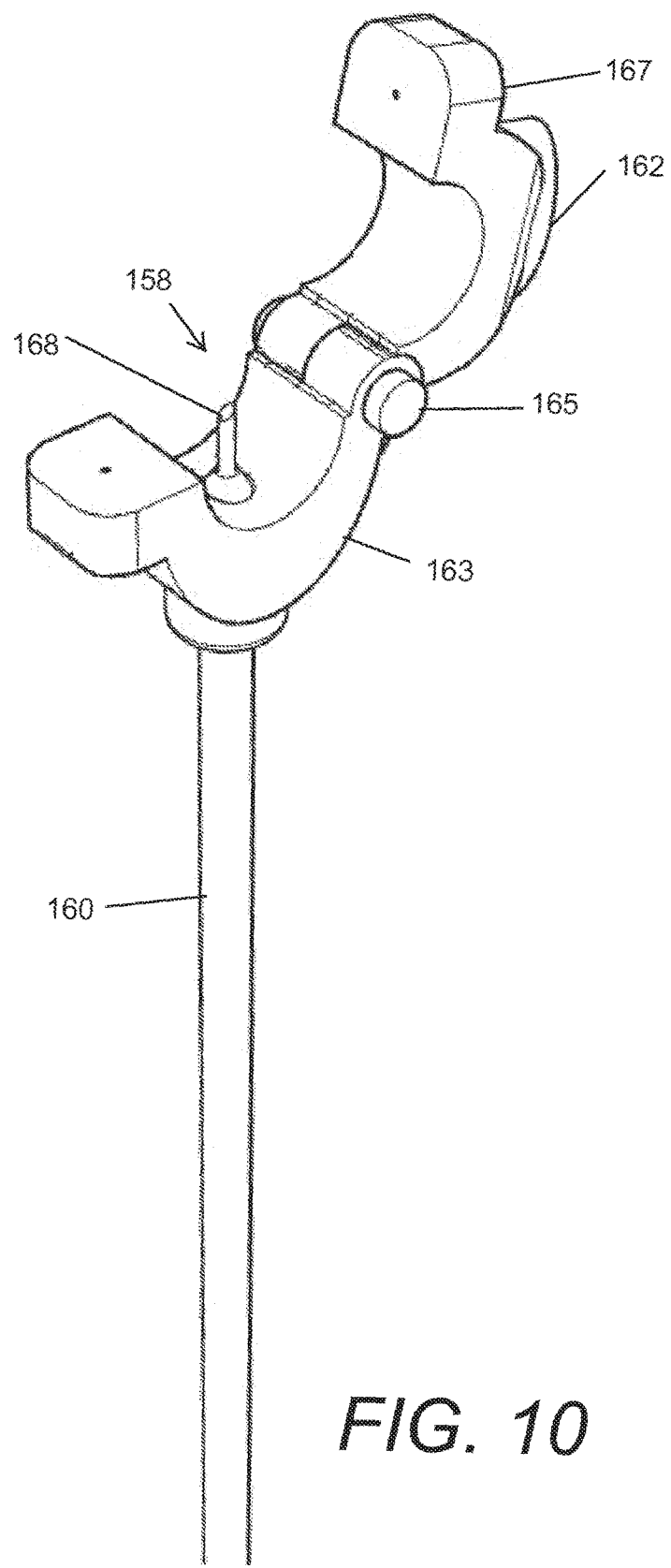
FIG. 10 is an isometric view thereof.
Figure 11:
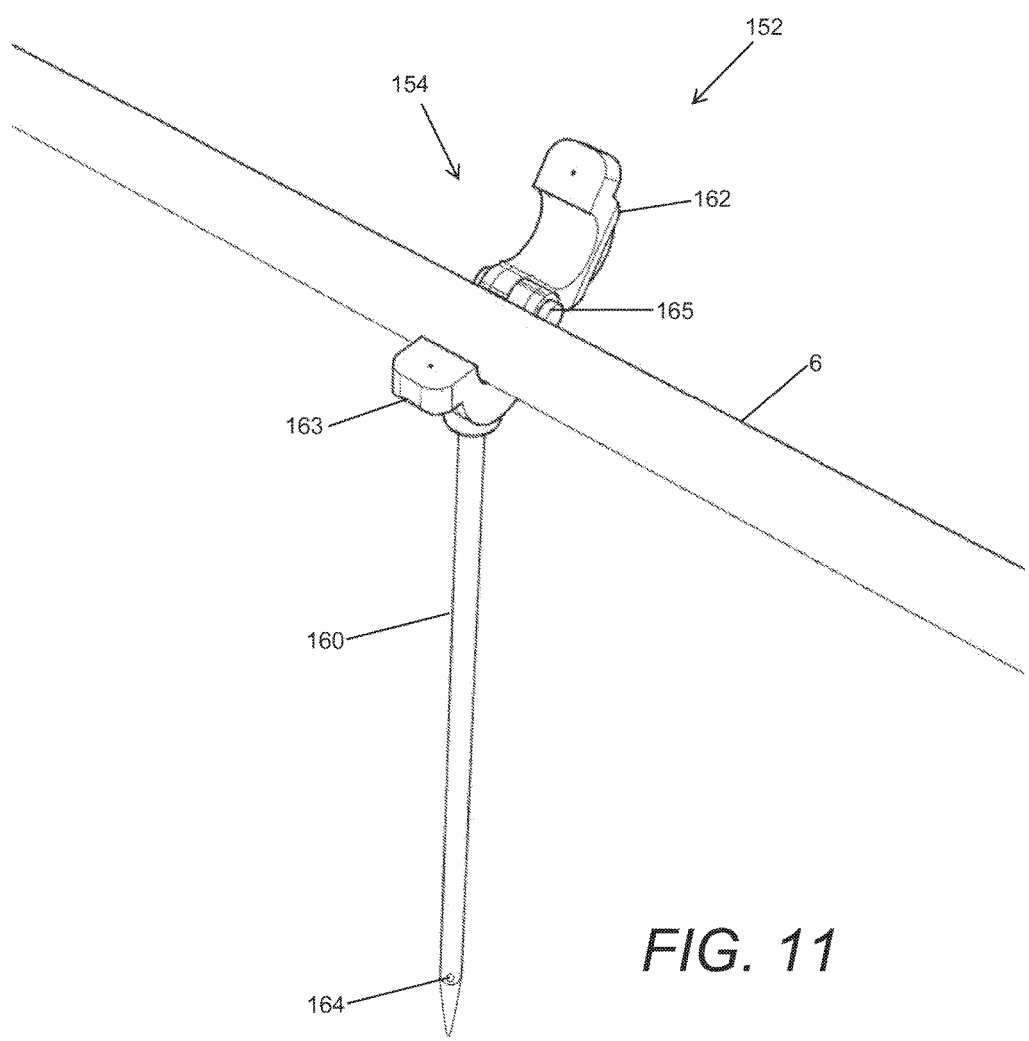
FIG. 11 is an isometric view thereof shown in context with a hose environment.
Figure 12:
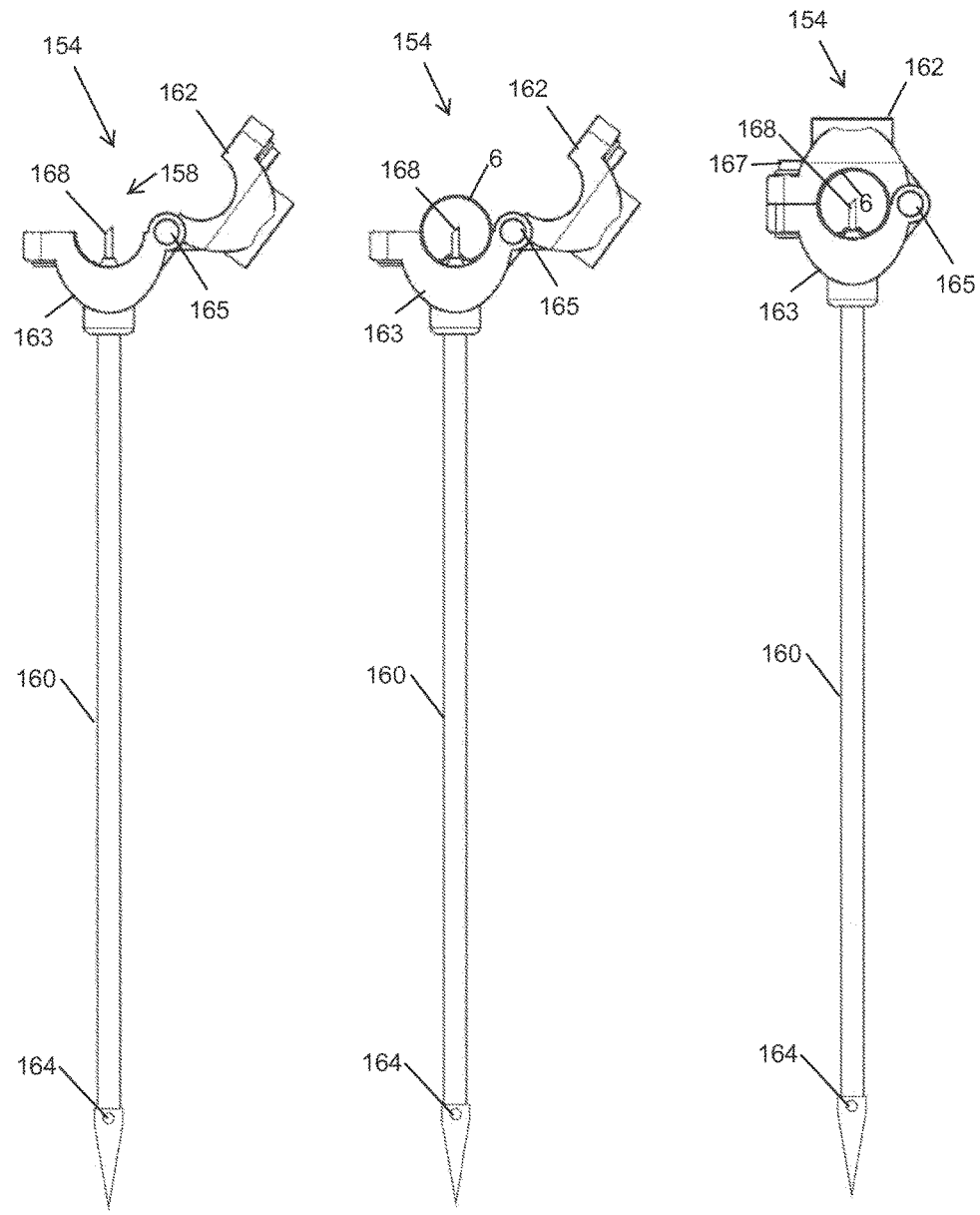
FIG. 12 is a front elevational view thereof, showing a progression of steps of installing a hose pipe into the embodiment.
Figure 13:
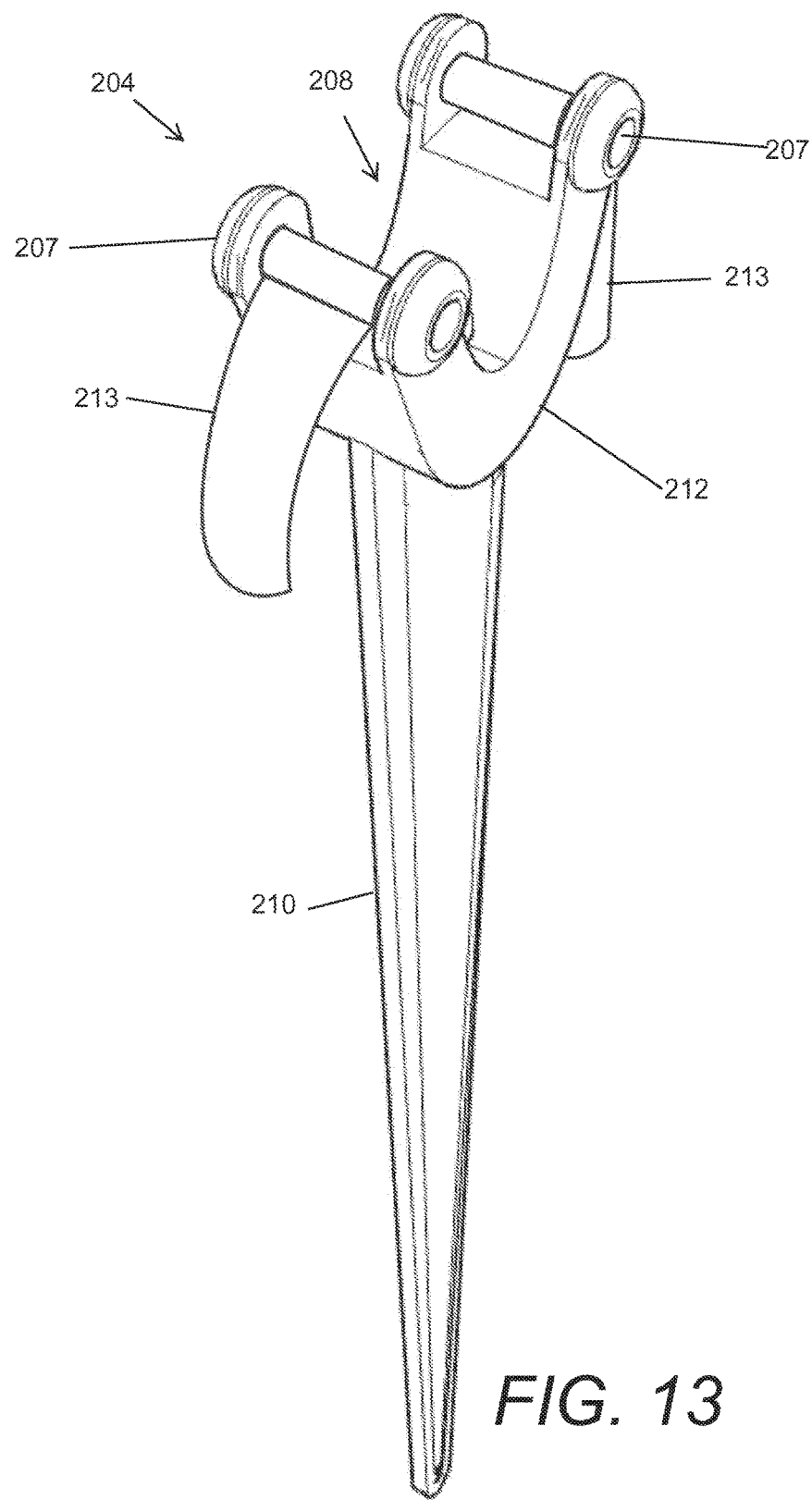
FIG. 13 is an isometric view of yet another alternative embodiment of the present invention.
Figure 14:
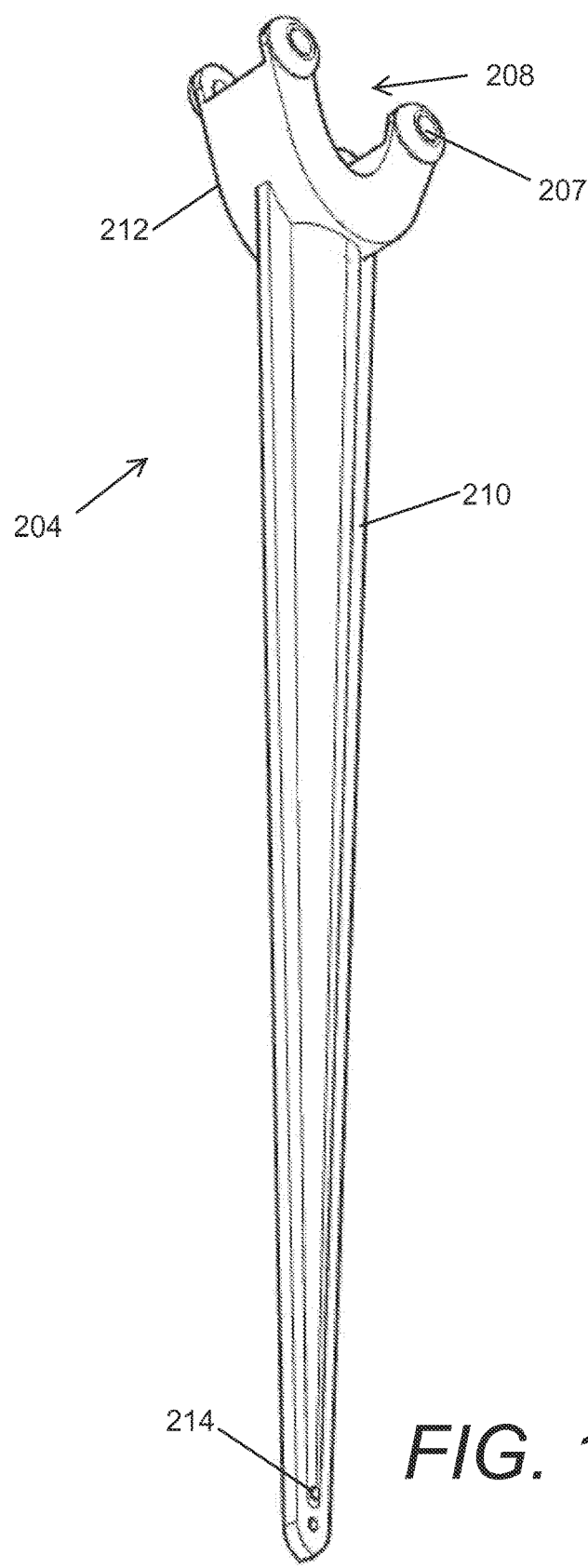
FIG. 14 is another isometric view thereof.
Figure 15:
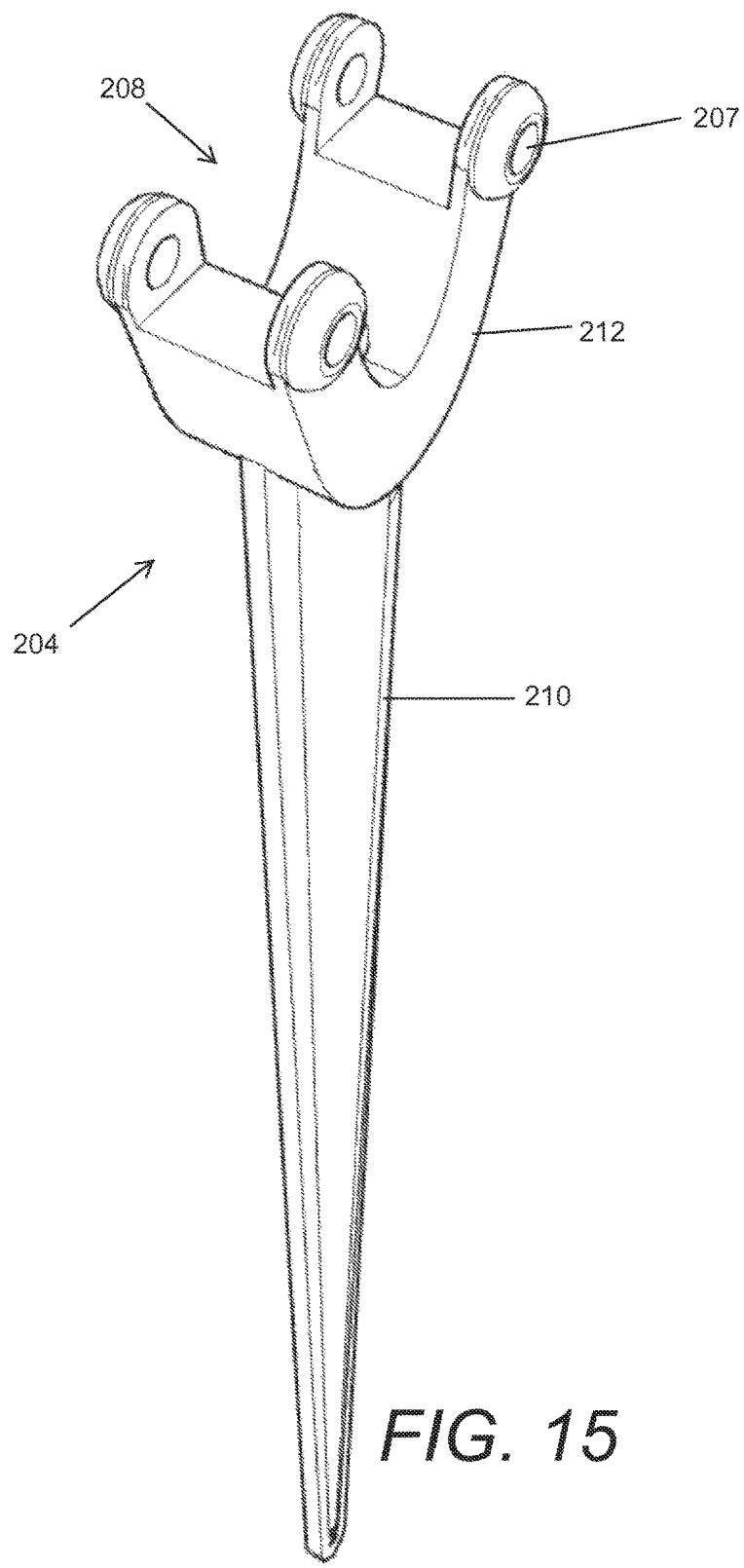
FIG. 15 is another isometric view thereof.
Figure 16:
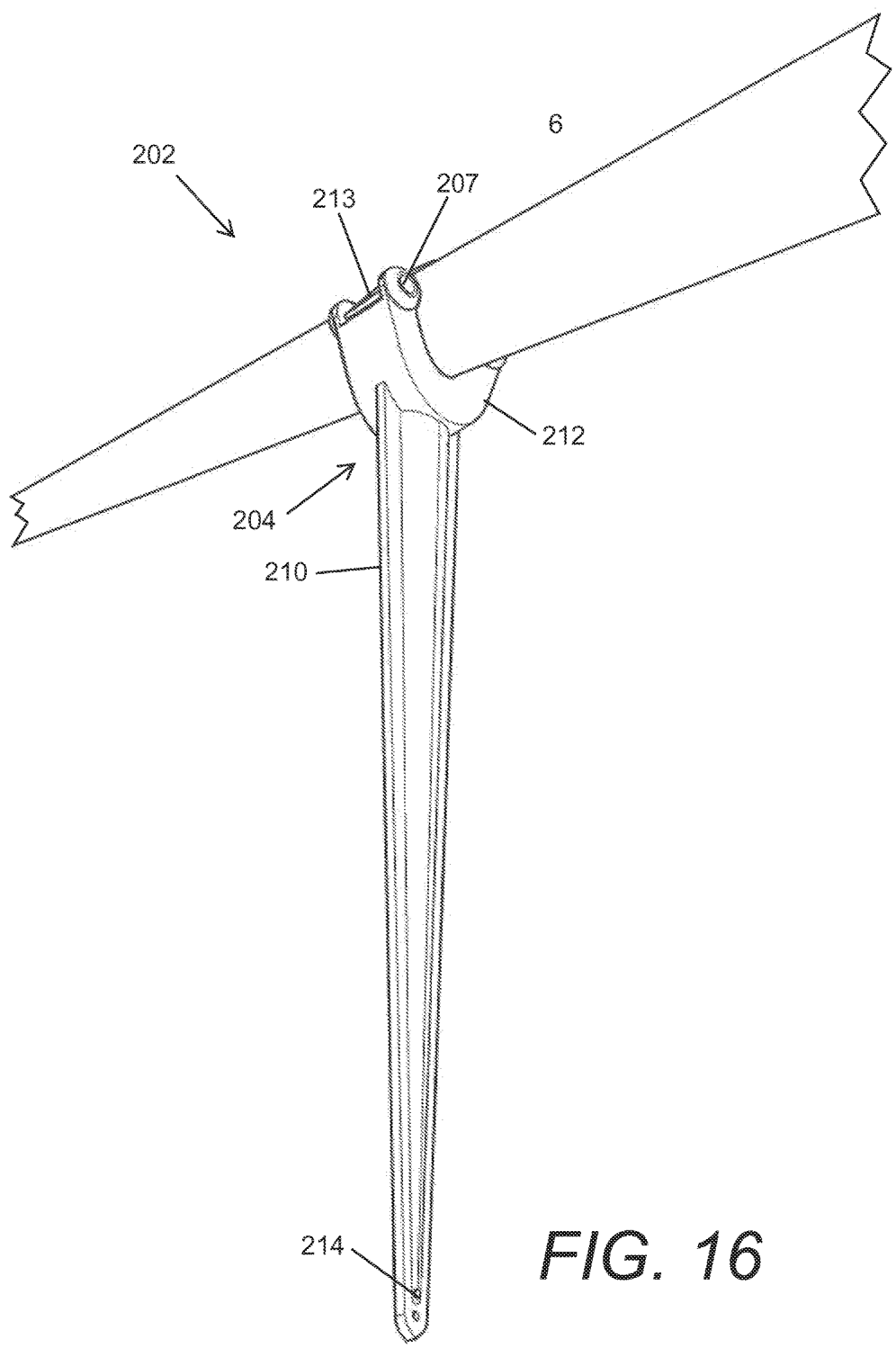
FIG. 16 is another isometric view thereof shown in context with a hose environment.
Figure 17:
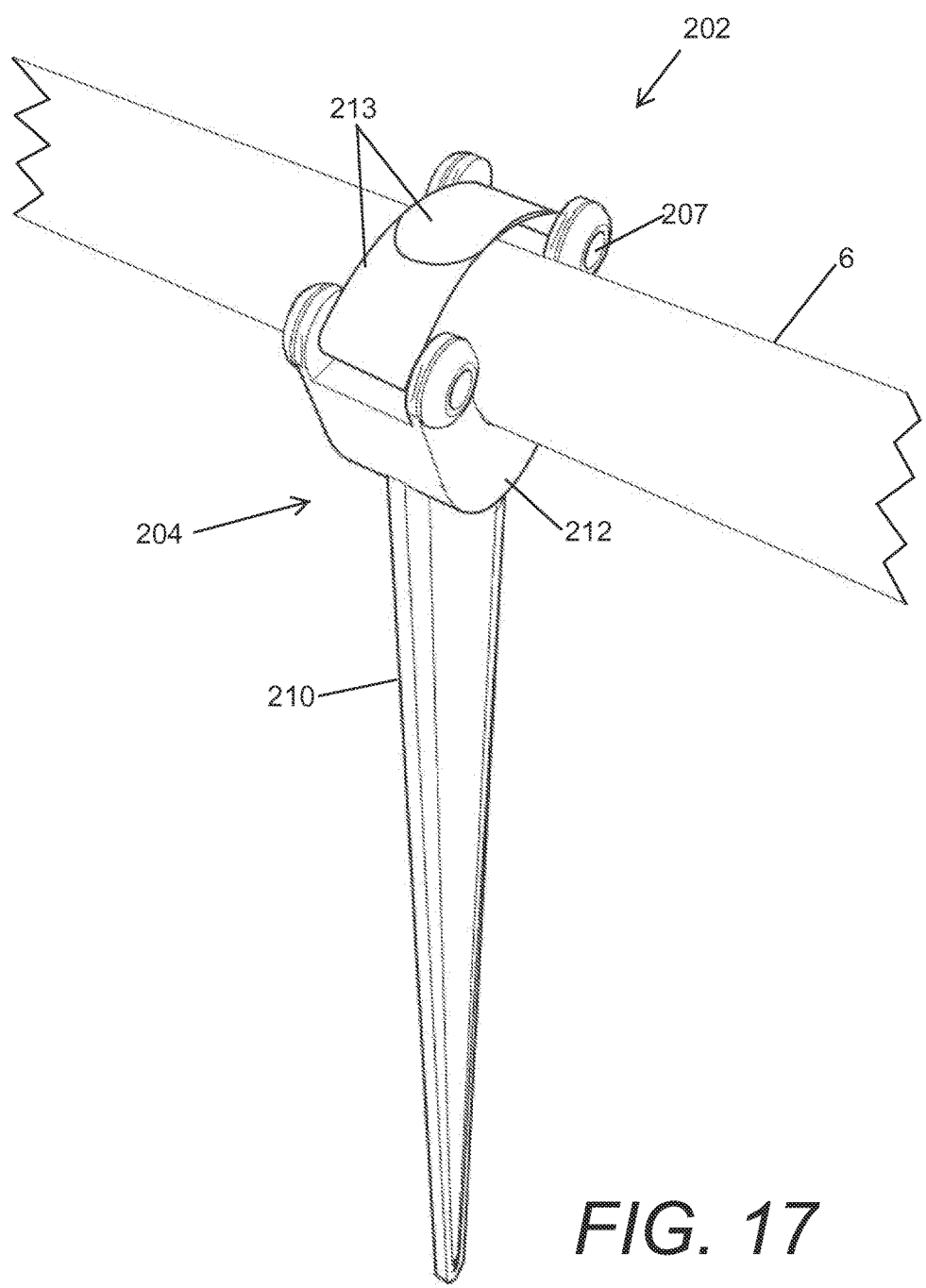
FIG. 17 is another isometric view thereof.

FIGS. 5 and 6 show a remote garden spike irrigation system 102. Similar to above, this system includes an irrigation spike 104 with a spike body 110, an irrigation outlet port 114, a penetrating tip 116, and an attachment clamp 112. This embodiment also features a remote tube 120 allowing the irrigation spike 104 to be placed some distance away from the hose 6. This would be used to water a tree or a potted plant, for example, while maintaining the normal irrigation line using the irrigation spikes 4 of the previous embodiment. This embodiment allows flexibility in where the irrigation is applied. The length of the remote tube 120 can vary.

IV. Alternative Embodiment Irrigation Spike Watering System 152

FIGS. 7-12 show an alternative embodiment irrigation spike irrigation system 152 including a flip-top attachment clamp having a top portion 162 which flips open to allow the clamp to surround a hose, and then clamps shut against a bottom portion 163. A hinge 165 holds the two components of the clamp together, and a lock 167 clamps the attachment clamp over the hose 6 once it has been inserted. The piercing needle 168 pierces the hose in the same manner as described above.

This embodiment also includes a main stem 160 of the irrigation spike 154 and an irrigation outlet port 164 near the tip of the stem 160. The housing space 158 for receive the hose 6 is shown as round in the figures, but could be altered to include a similar cross-sectional shape as the preferred embodiment discussed above.

This embodiment is a more secure embodiment in that it locks onto the hose and prevents jostling or moving of the spike 154. However, the lockable clamp and hinge provide areas of potential failure of the device, which the preferred embodiment discussed above would not have. The lock 167 and clamp 162 could provide additional security to prevent the hose 6 from being removed from the spike 154.

V. Alternative Embodiment Irrigation Spike Watering System 202

FIGS. 13-20 show an alternative embodiment irrigation spike irrigation system 202 including a pair of flip-top attachment clamps 213 which flip open to allow the clamp to surround a hose 6, and then clamp shut. A hinge 207 holds each flip-top attachment clamp 213 to the rest of the clamp body 212. The hinge locks the flaps into place. The piercing needle 218 pierces the hose in the same manner as described above. Water then travels downwards through the spike body 210 and is introduced into the ground through the irrigation outlet port 214.

Figure 18:
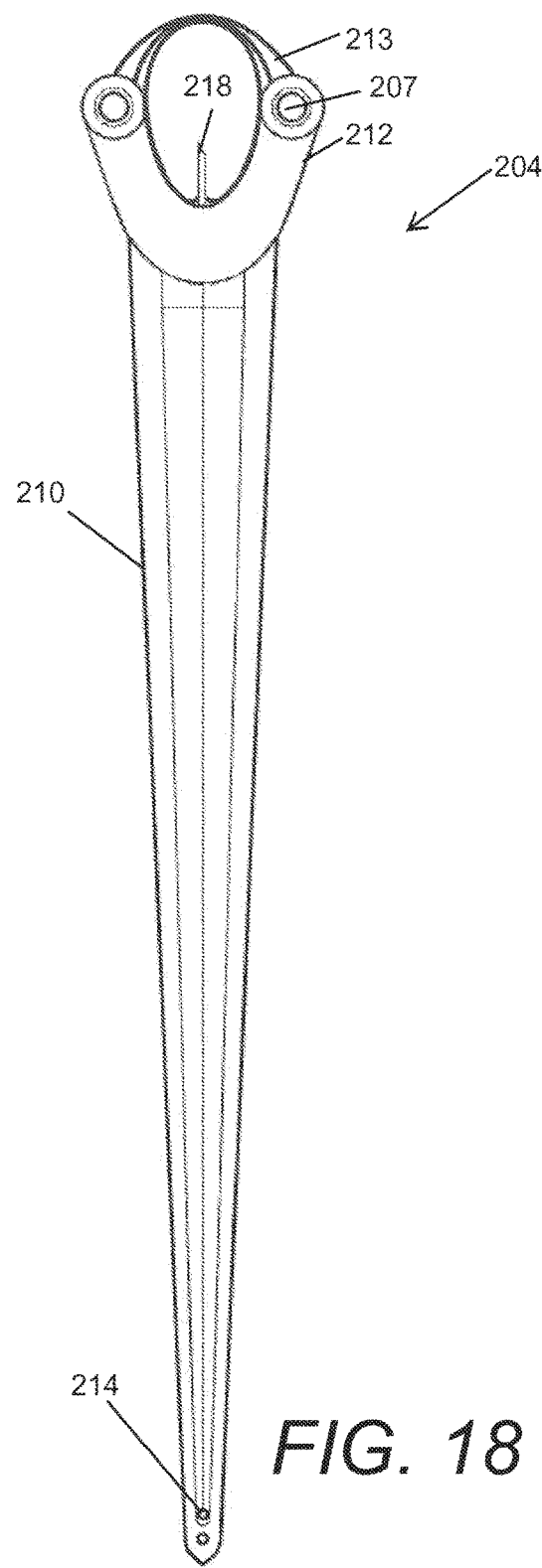
FIG. 18 is a front elevational view thereof.
Figure 19:
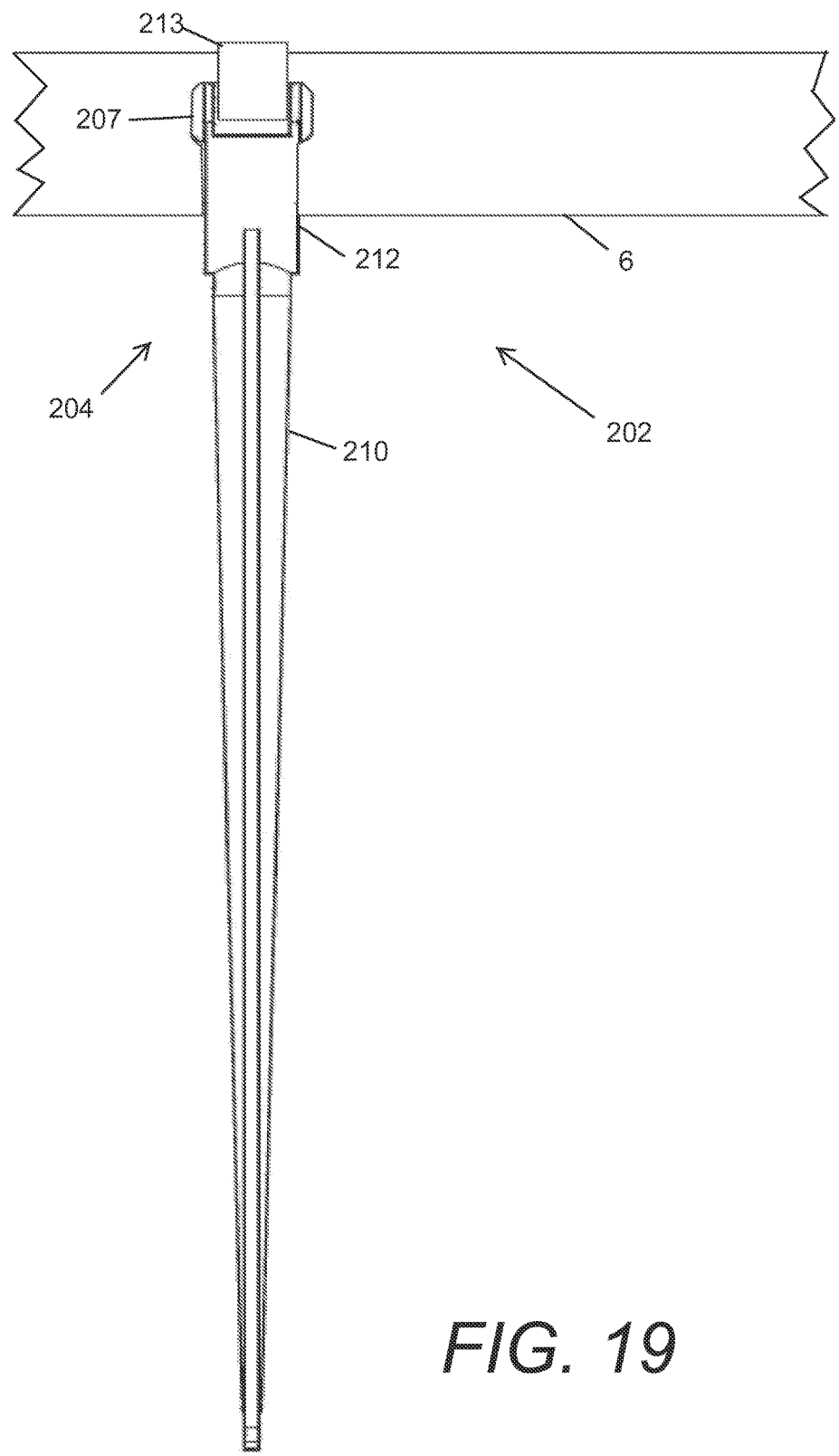
FIG. 19 is a side elevational view thereof.
Figure 20:
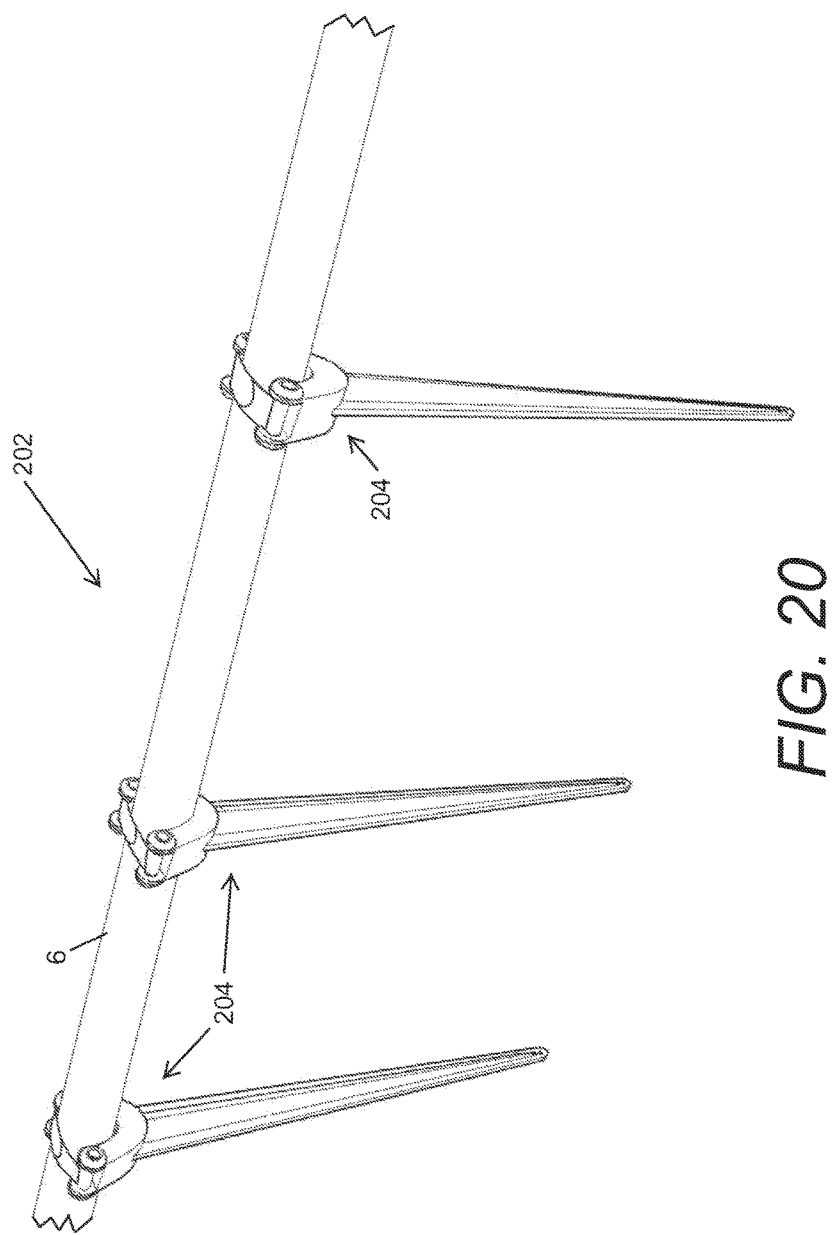
FIG. 20 is an isometric view thereof, showing a plurality of irrigation spikes.

This embodiment is a more secure embodiment in that it locks onto the hose 6 and prevents jostling or moving of the spike 204. However, lockable clamps and hinges provide areas of potential failure of the device, which are not present in the preferred embodiment. As shown in FIG. 18, this embodiment includes a similar cross-section of the hose 6 as the preferred embodiment above, wherein the hose 6 is deformed within the housing space 208 of the clamp 212.

It is to be understood that while certain embodiments and/or aspects of the invention have been shown and described, the invention is not limited thereto and encompasses various other embodiments and aspects.

Having thus described the disclosed subject matter, what is claimed as new and desired to be secured by Letters Patent is:

1. An irrigation system comprising:
at least one irrigation spike, said irrigation spike including an attachment clamp attached to the top of a stake configured to be placed in the ground, said stake terminating at a tip; a garden hose;
said attachment clamp including an opening having an oblong shape, said opening including an upper curve and a lower curve, wherein said upper curve is larger than said lower curve, said opening receiving a garden hose through the top of said opening, and wherein said garden hose is deformed by said opening such that a lower curve of a cross section of said garden hose within said attachment clamp is smaller than a top curve of said cross section of said garden hose;
said attachment clamp having an open top portion receiving said garden hose, and wherein said open top portion remains open after insertion of said garden hose;
a hollow needle connected to an irrigation tube located within said stake, said hollow needle configured to pierce said garden hose when said garden hose is inserted into said opening, said hollow needle further configured to draw liquid from said garden hose; and
an outlet port located in proximity to the tip of said stake, said outlet port configured to deliver said liquid to an area of earth surrounding said stake.

2. The irrigation system of claim 1, further comprising a pair of rounded separators located in proximity to said tip of said stake beneath said outlet port, said separators configured to push the earth away from said outlet port when said stake is driven into the ground.

3. The irrigation system of claim 1, further comprising:
a flexible tube located between the top of said stake and said attachment clamp;
said flexible tube configured to transfer liquid drawn from said needle to said irrigation tube located within said stake; and
wherein said stake is inserted into the ground at a location remote from said attachment clamp.

4. The irrigation system of claim 1, further comprising:
a hinge affixed to said attachment clamp; and
a top flap hingedly connected to said attachment clamp, said top flap adapted to secure said garden hose within said space in said attachment clamp.

5. The irrigation system of claim 1, wherein said attachment clamp is comprised of a semi-flexible plastic capable of opening slightly when said hose is inserted into said opening and contracting slightly over said hose once said hose has been inserted into said opening.

6. An irrigation spike comprising: a garden hose;
an attachment clamp attached to the top of a tapered stake configured to be placed in the ground, said stake terminating at a tip;
said attachment clamp including an opening having an oblong shape, said opening including an upper curve and a lower curve, wherein said upper curve is larger than said lower curve, said opening receiving a garden hose through the top of said opening, and wherein said garden hose is deformed by said opening such that a lower curve of a cross section of said garden hose within said attachment clamp is smaller than a top curve of said cross section of said garden hose; said attachment clamp having an open top portion receiving said garden hose, and wherein said open top portion remains open after insertion of said garden hose;

a hollow needle connected to an irrigation tube located within said stake, said hollow needle configured to pierce said garden hose when said garden hose is inserted into said opening, said hollow needle further configured to draw liquid from said garden hose;

an outlet port located in proximity to the tip of said stake, said outlet port configured to deliver said liquid to an area of earth surrounding said stake; and a pair of rounded separators located in proximity to said tip of said stake beneath said outlet port, said separators configured to push the earth away from said outlet port when said stake is driven into the ground.

7. The irrigation spike of claim 6, further comprising:
a flexible tube located between the top of said stake and said attachment clamp;
said flexible tube configured to transfer liquid drawn from said needle to said irrigation tube located within said stake; and
wherein said stake is inserted into the ground at a location remote from said attachment clamp.

8. The irrigation spike of claim 6, wherein said attachment clamp is comprised of a semi-flexible plastic capable of opening slightly when said hose is inserted into said opening and contracting slightly over said hose once said hose has been inserted into said opening.

* * * * *